Nov. 12, 1929.  H. E. ALTGELT  1,735,715

TRACTION WHEEL LUG

Filed May 26, 1928

INVENTOR.
HERMAN E. ALTGELT
BY John P. Smith
ATTORNEYS.

Patented Nov. 12, 1929

1,735,715

UNITED STATES PATENT OFFICE

HERMAN E. ALTGELT, OF SOUTH BEND, INDIANA, ASSIGNOR, BY MESNE ASSIGNMENTS, TO OLIVER FARM EQUIPMENT COMPANY, A CORPORATION OF DELAWARE

TRACTION-WHEEL LUG

Application filed May 26, 1928. Serial No. 280,727.

The present invention is directed to a novel and simplified construction of a traction wheel lug, and particularly the manner in which the same is attached to a traction wheel of the narrow rim type.

A further object of the invention is to provide a novel form of traction wheel lug in combination with a narrow rim traction wheel in which the fastening means in the form of a bolt, extends in a radial direction with respect to the wheel, within a bracket riveted to one side of the rim.

These and other objects are accomplished by providing a construction and an arrangement of the various parts in the manner hereinafter described, and particularly pointed out in the appended claims.

Referring to the drawings, Fig. 1 is a side elevational view of a fragmentary portion of a narrow rim traction wheel showing my improved form of lug mounted thereon, and means for securing it to the rim.

The lug illustrated and described in the present instance is adapted for use in connection with the form of traction wheel illustrated and described in my co-pending application, Serial No. 269,193, filed April 11th, 1928.

Figure 1:
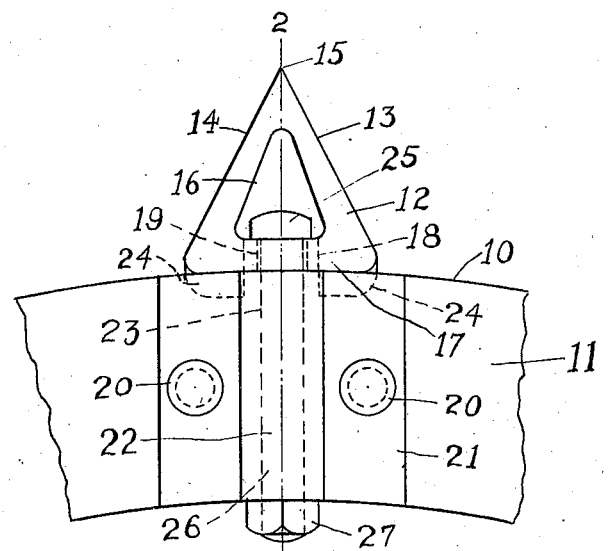
Figure 2:
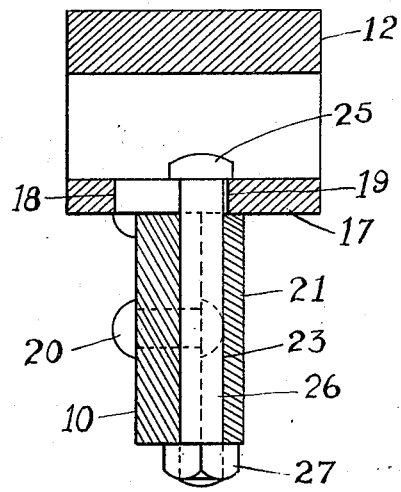
Fig. 2 is a cross sectional view taken on the lines 2—2 of Fig. 1.
Figure 3:
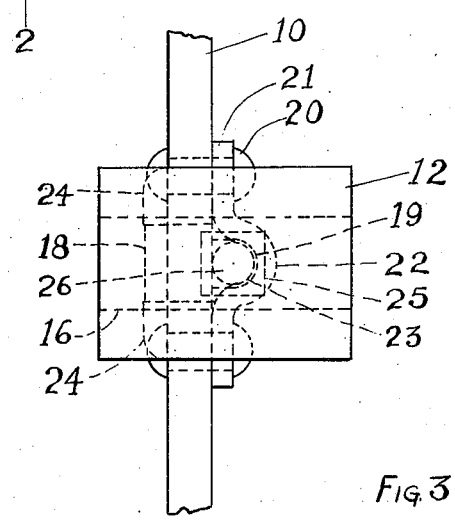
Fig. 3 is a top plan view of the lug shown in Fig. 1.

In illustrating one form of my invention, I have shown the same in connection with the narrow rim traction wheel, a fragmentary portion of which is shown in Fig. 1 and generally indicated by the reference character 10. This narrow rim member is preferably made of a flat piece of steel with the narrow edge thereof forming the outer periphery of the wheel, and the relatively wide surface thereof, as indicated at 11 extending parallel with the lines forming the radii of the wheel. The lug proper, generally indicated by the reference character 12 comprises a hollow form of lug having inclined surfaces 13 and 14, which converge to an apex indicated at 15. Extending longitudinally through the body portion of the lug is a substantially triangular opening 16 forming a base or bottom portion as indicated at 17. Extending through the base or bottom portion 17 of the lug is a square opening 18 located to one side of the medial center of the lug, through which the head of the fastening bolt, hereinafter described, may be inserted. Located on one side of the square aperture 18 and communicating therewith so as to occupy a position substantially in the center of the lug, is an elongated semicircular aperture or recess 19, through which the shank of the bolt extends. Secured to one side of the rim 10 of the wheel by means of rivets 20 is a bracket 21, which has its center portion thereof, as indicated at 22, offset or raised to embrace the bolt, or in other words, so as to form an aperture 23 between the bracket 21 of the rim 10 of the wheel. The bracket 21 is of substantially the same width as the rim 10. Projecting inwardly from the base 17 of the lug 12, and preferably adjacent one side thereof, are two projections 24 which are adapted to engage one side of the rim for preventing the lug from turning on the bolt.

After the bracket 21 has been secured to the rim by means of the rivet 20, the head 25 of the bolt 26 is inserted in the square aperture 18 in the base 17 of the lug 12, and adjusted so that the body portion of the bolt is set into the elongated semi-circular slot 19, after which the bolt is inserted in the opening or recess 23 of the bracket and the nut 27 is then secured to the threaded end of the bolt for securely fastening the lug to the rim. It will be observed that the projections 24 formed on the bottom of the lug engage one side of the rim opposite the bracket 21 and prevent the lug from turning on the bolt. It will of course, be understood, that any number of these brackets may be secured to the side of the rim at the proper spaced intervals, so that any required number of these lugs may be mounted on the rim.

From the above description it will be seen that I have not only provided a very simple and efficient construction of a traction wheel lug, but also, a novel means of securing the same to a narrow rim traction wheel, which permits readily attachment to or detachment from the rim.

While in the above specification I have described one embodiment which my invention may assume in practice, it will, of course, be understood that the same is capable of modification, and that modification may be made without departing from the spirit and scope of the invention as expressed in the following claims.

What I claim as my invention and desire to secure by Letters Patent is:

1. The combination of a narrow rim traction wheel, a traction wheel lug therefor, a bracket secured to one side of said rim, and a bolt detachably secured to said lug and extending between said rim and said bracket for securing said lug to said rim.

2. The combination of a narrow rim traction wheel, a traction wheel lug therefor, a bracket secured to one side of said rim, and radially disposed securing means extending between said rim and bracket, for securing said lug to said rim.

3. The combination of a narrow rim traction wheel, a traction wheel lug therefor, a bracket secured to one side of said rim having a semi-circular offset portion formed therein, and a radially disposed securing bolt detachably secured to said lug and extending through the semi-circular recess in said bracket for securing said lug to said rim.

4. The combination of a narrow rim traction wheel, a traction wheel lug therefor, a bracket secured to one side of said rim, projections formed on one side of said lug and engageable with said rim, and a bolt detachably secured to said lug, located on the other side of said rim and extending between said rim and said bracket, for securing said lug to said rim.

5. The combination of a narrow rim traction wheel, a traction wheel lug therefor, there being a longitudinal opening extending through said lug, an aperature in the base of said lug for permitting the head of the bolt to pass therethrough, a bracket secured to one side of said rim, and a bolt detachably secured in the aperture of said lug and extending between said rim and said bracket for securing said lug to said rim.

6. The combination of a narrow rim traction wheel, a traction wheel lug therefor, there being a longitudinally extending opening in said lug, said lug having an aperture in the bottom thereof communicating with said first named aperture, through which the head of a bolt may pass, projections formed on the inner side of said lug and engageable with one side of said rim, a bracket secured to the other side of said rim, and a bolt having its head thereof detachably mounted in the aperture in the base of said lug, and extending between said rim and bracket for securing said lug to said rim.

In testimony whereof I affix my signature.

HERMAN E. ALTGELT.